Figure 1:
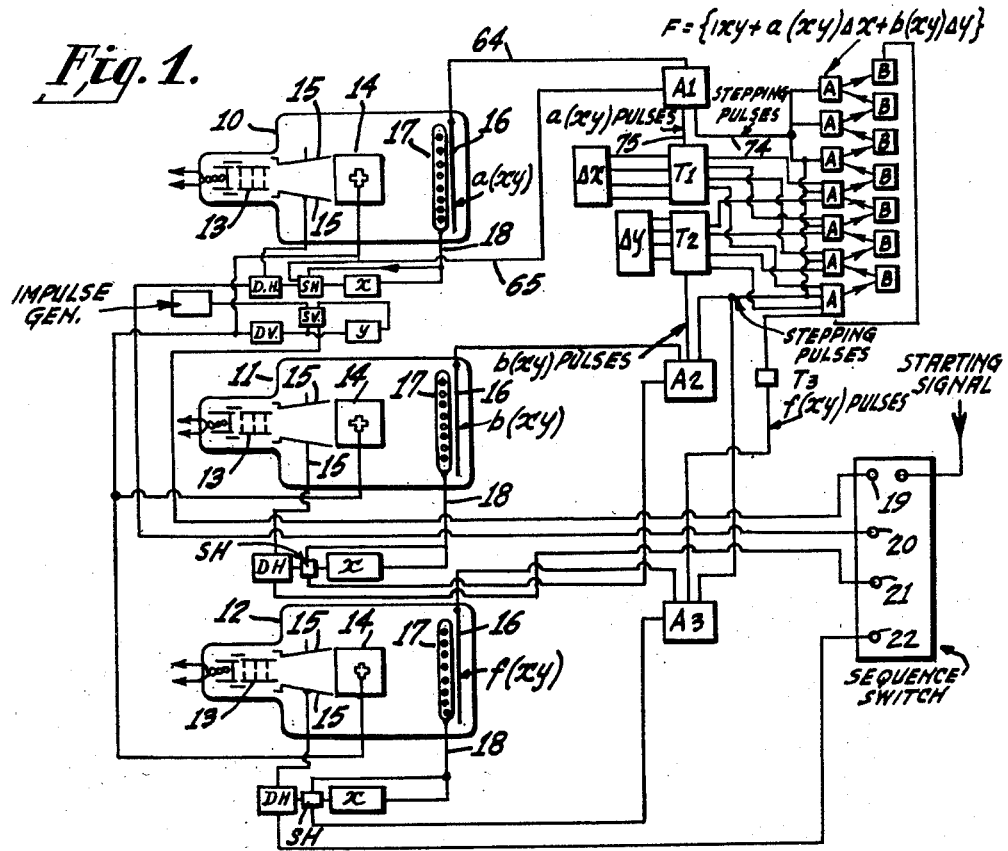

Feb. 10, 1948.   G. A. MORTON ET AL   2,435,841
COMPUTING DEVICE
Filed Jan. 5, 1944   6 Sheets-Sheet 1

Inventors
GEORGE A. MORTON
& LESLIE E. FLORY
By C. D. Tuska
Attorney

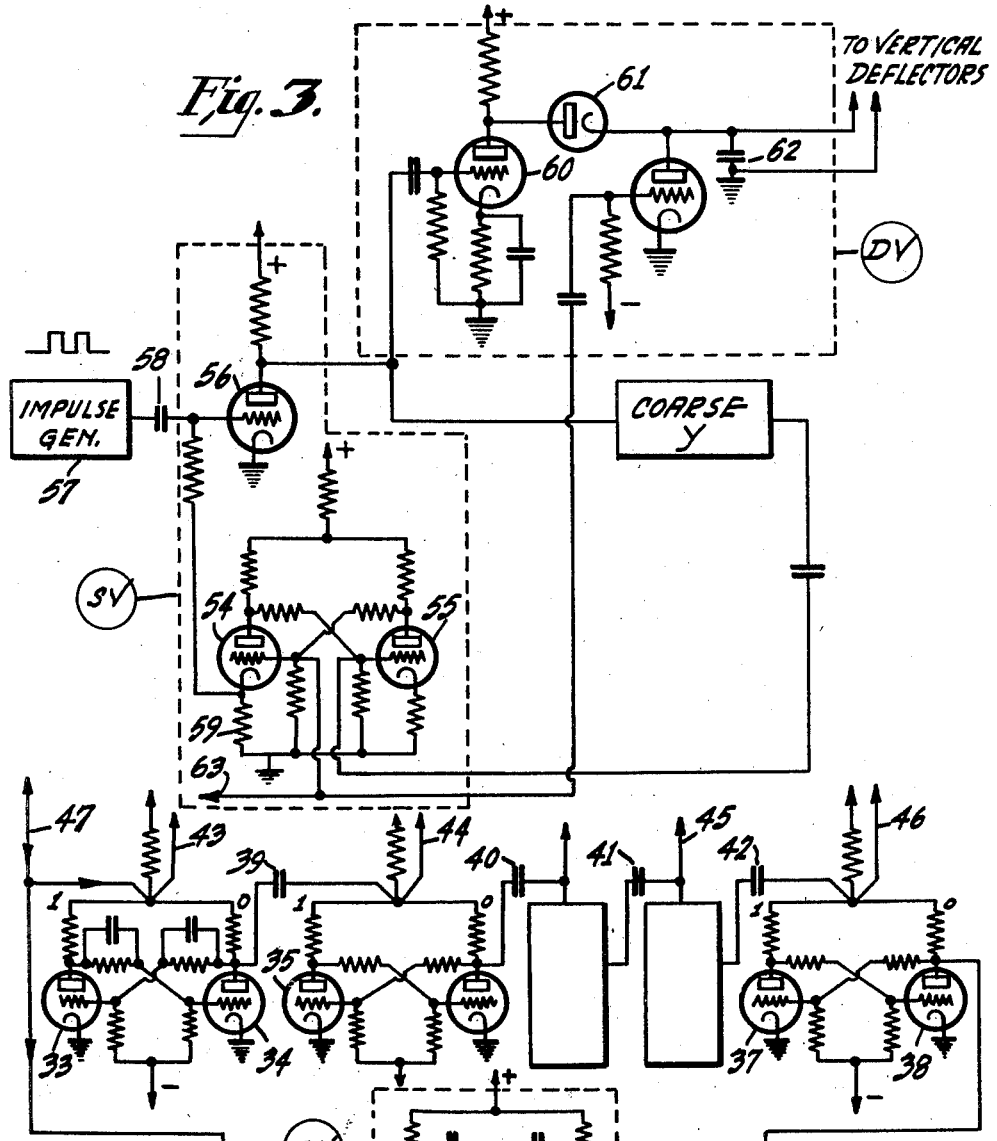
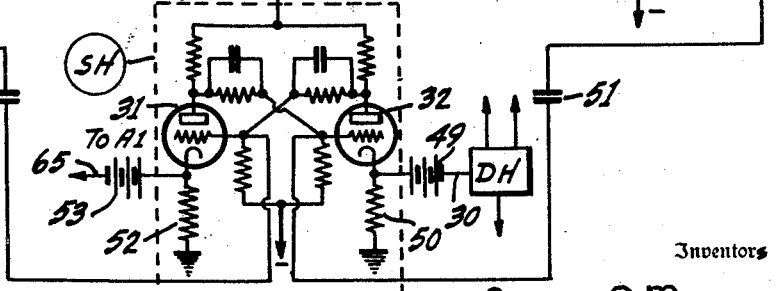

Inventors
GEORGE A. MORTON
& LESLIE E. FLORY

Patented Feb. 10, 1948

2,435,841

UNITED STATES PATENT OFFICE 2,435,841

COMPUTING DEVICE

George A. Morton and Leslie E. Flory, Princeton, N. J., assignors to Radio Corporation of America, a corporation of Delaware Application January 5, 1944, Serial No. 517,048

12 Claims. (Cl. 235—61)

This invention relates to computing devices such as are utilized to generate a desired function of two or more variables, and has for its principal object the provision of an improved computing device and method of operation whereby such a function may be derived by simple control operations without the necessity of involved mathematical computations.

The principle employed in generating arbitrary functions of two variables such as are required to determine time of flight, gun elevation and the like consists basically of determining the value of the function and its rate of change with respect to the two variables at a number of discrete points and interpolating between these points. In accordance with the present invention, matrices are used for evaluating the required quantities, and the fundamental elements containing the matrices for generating impulse number trains representing the necessary quantities are cathode-ray tube, similar to the monoscope utilized in television technique.

The monoscope consists of an electron gun, deflection means and a special screen or target which is connected to an external signal lead. These elements are enclosed in an evacuated envelope. Information is recorded on the special screen in the form of fine lines of carbon or the like, having a different secondary electron emission rate from the screen background which may consist of aluminum or an equivalent material. As the electron beam sweeps across the screen, a current pulse due to the change in secondary electron emission is generated each time a line is crossed. Pulses formed in this way are amplified and applied to a totalizing device.

The screen may be similar to a sheet of cross-section paper, in that it is divided into squares so that the vertical and horizontal positions of the squares represent the variables $x$ and $y$. Information is recorded in the squares in the form of lines representing binary numbers. Two types of lines are used, a narrow line for digit zero (0) and a wide line for digit one (1). The width of the electron beam is made just small enough to resolve the narrow lines. Consequently, the output pulses are of the same width but differ in amplitude, a large amplitude representing 1 and a small amplitude representing 0. When the electron beam sweeps across such a group of lines, potentials representative of a series of digits are developed.

The beam is normally biased to the lower left hand corner of the screen, is deflected upwardly into alignment with the selected row of squares (see Fig. 5) and is then deflected horizontally across the index wires beginning with the first of these wires.

Thus, to obtain a number $N=f(X_i,Y_j)$, the beam is first deflected vertically by an amount corresponding to the $j$ rows of squares; in other words, to the horizontal row of matrix squares containing the data pertinent to the coarse point $Y_j$. For this step, it is arranged that the vertical deflection is linear and that $V_0-jV_1$ volts are applied to the deflecting electrodes, $V_0$ being the voltage required to deflect the beam from the center to the bottom of the matrix pattern, and $V_1$ the voltage required to move the beam one row vertically. The beam is then deflected horizontally to the beginning of the square corresponding to the coarse point $x_i$. Since here the beginning of the recorded number must be known with considerable accuracy, it is not satisfactory to depend upon linearity of deflection. Instead, thin straight vertical wires are stretched across the screen just ahead of the squares for indexing the horizontal deflection.

The signal from the selected square of the screen is in the form of potentials representative of the successive digits of the binary number recorded on that particular square. These potentials are amplified and then divided into stepping pulses (one for each digital position) and impulses corresponding to the digital positions where 1 appears in the recorded number. The stepping pulses are utilized to control the operation of a totalizing device, wherein the product of the recorded number and the fine value of the variable is established, the pulses corresponding to the digit 1 being combined with this fine value to establish the desired product.

In the illustrated form of the invention, three matrices are utilized to evaluate the function completely. The invention, however, does not necessarily involve three monoscope tubes, since if the resolution requirements are not too great, more than one matrix may be placed on a single screen. For convenience in understanding, however, separate cathode ray tubes for each matrix are shown.

Important objects of the invention are to provide a function generator having various terms of the function or factors of these terms recorded on successive areas in the form of lines of a different secondary electron emissiveness from the background of the screen, to provide means for automatically selecting a predetermined one of such areas, to provide means for moving an electron beam at one speed for selecting a predetermined one of such areas, and at another speed to scan such area, and to provide means whereby these various factors and terms are combined to produce the desired function.

The invention will be better understood from the following description considered in connection with the accompanying drawings, and its scope is indicated by the appended claims.

Figure 2:
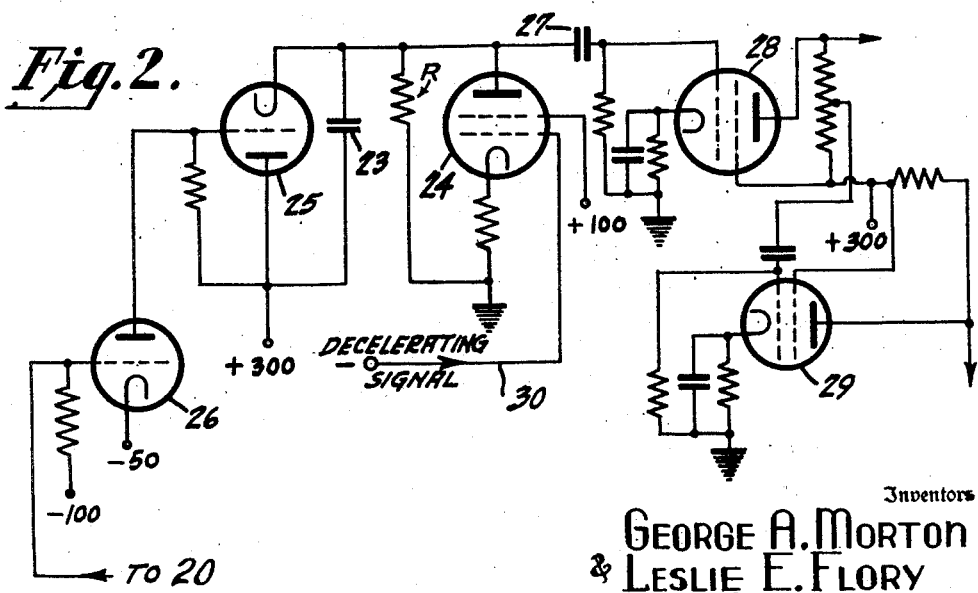

Referring to the drawings:

Figure 1 is a block diagram illustrating the complete computing device and bearing legends identifying the quantities involved in the operation of the device, Figure 2 is a wiring diagram of the horizontal deflecting generator DH of Fig. 1.

Figure 5:
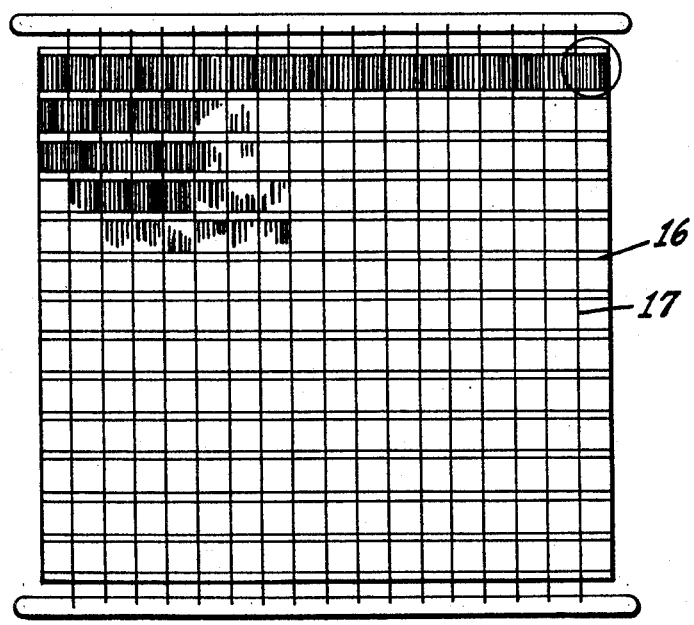
Figure 6:
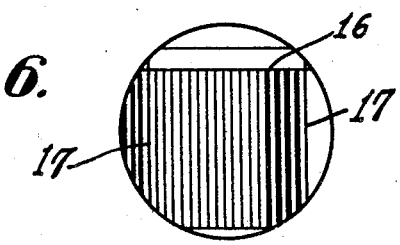
Figure 7:
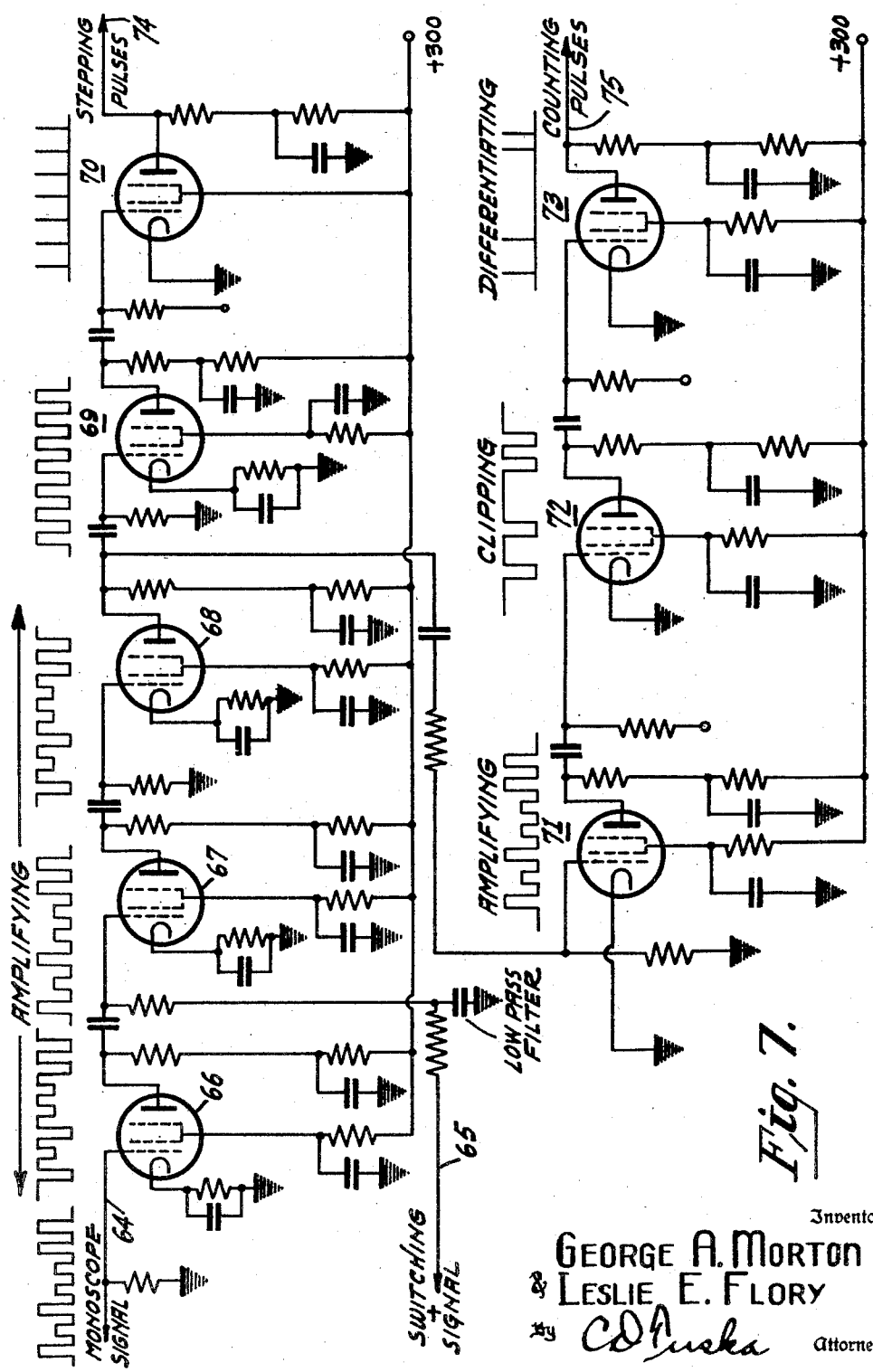
Figure 8:
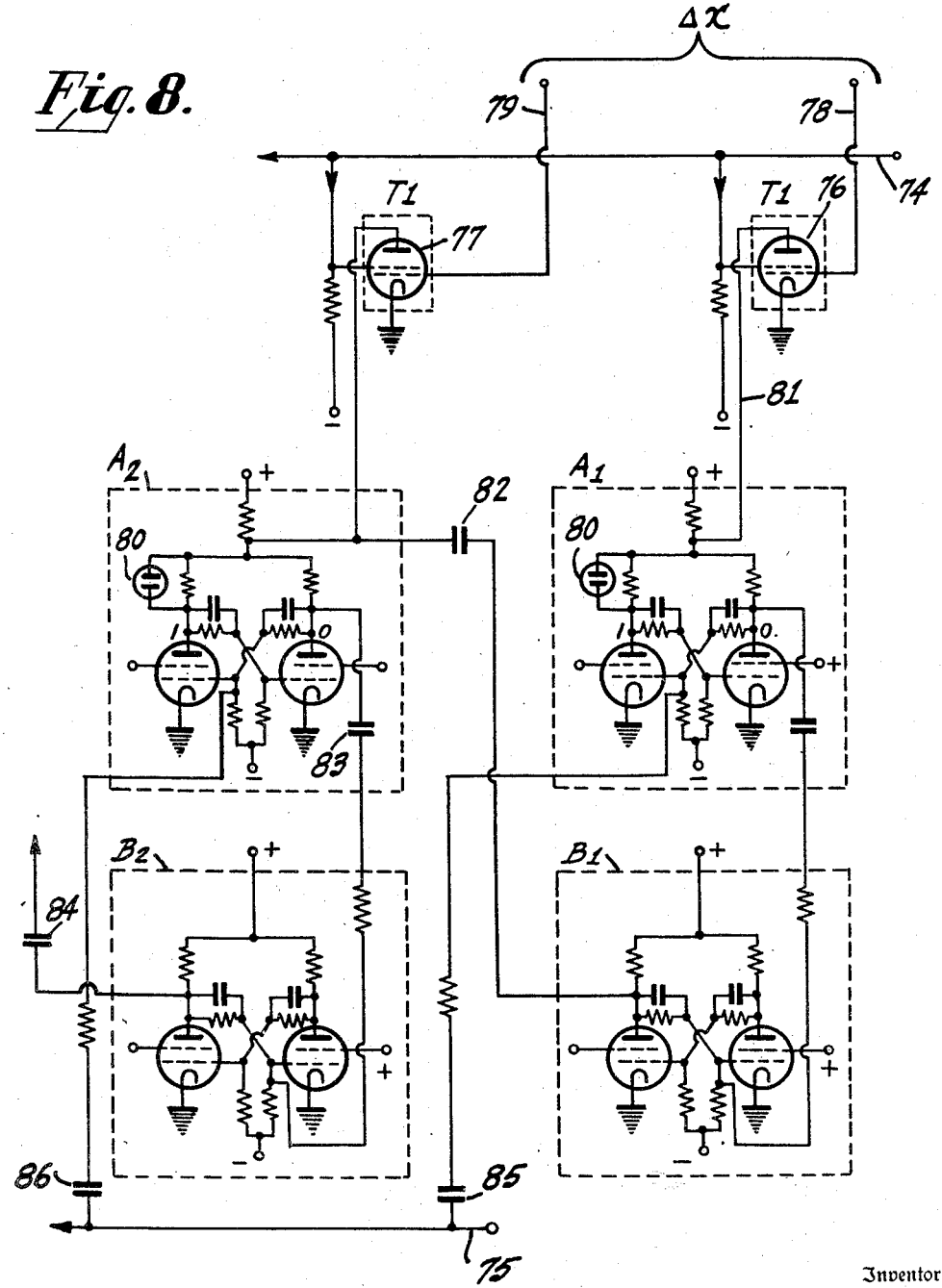
Figure 9:
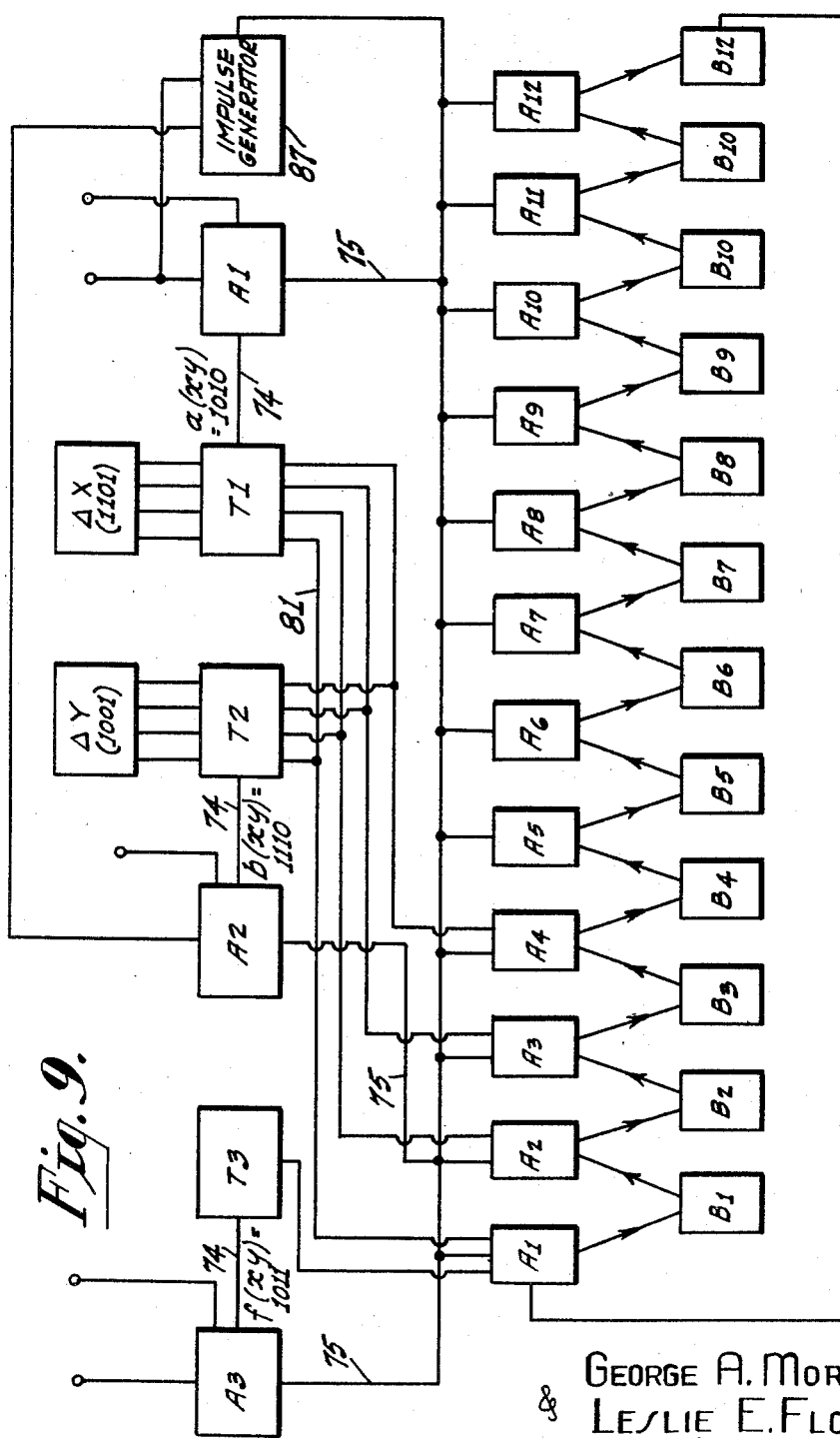

Fig. 3 is a wiring diagram of the vertical deflecting system which includes the impulse generator, the switch SV, the vertical deflection generator DV and the coarse set-up device Y of Fig. 1, Fig. 4 is a wiring diagram of that part of the horizontal deflecting system including the switch SH and the coarse X set-up device of Fig. 1, Fig. 5 is a front elevation of the matrix and the horizontal indexing wires, Fig. 6 is an enlarged view of one corner of the screen of Figure 6, showing the lines corresponding to the different digital positions of the recorded number, the wide lines representing the digit 1 and the narrow lines representing the digit 0, Fig. 7 is a wiring diagram of the amplifier and other elements enclosed in the box AI of Fig. 1, Fig. 8 is a wiring diagram illustrating part of the connections of the totalizing device appearing at the upper right-hand corner of Figure 1, and Fig. 9 is an enlarged diagram of the totalizer.

In considering Figs. 1, 5 and 6, it should be remembered that the horizontal indexing wires are shown as perpendicular to the paper in Fig. 1 and as extending lengthwise of the paper in Figs. 5 and 6, and that these wires are all connected through a common output terminal to other parts of the device as hereinafter explained.

If the function to be evaluated is $$f(x,y) = f_{ij} + a_{ij}\Delta x + b_{ij}\Delta y$$

the operation of the device involves (1) separation of the variables $x$ and $y$ into the coarse points $x_i$ and $y_j$ and into the fine points $\Delta x$ and $\Delta y$, (2) evaluation of the quantities $f_{ij}$, $a_{ij}$ and $b_{ij}$ from the monoscopes and (3) two multiplications and three additions. Numbers representing the coarse points of the two variables are set up in the coarse $y$ and coarse $x$ set-up devices which operate, together with other parts of the device, to select the particular square on which the quantity $f_{ij}$, $a_{ij}$ or $b_{ij}$ is recorded. Numbers representing the fine points of the two variables are set up on the set-up devices $\Delta x$ and $\Delta y$ which cooperate with the elements AI—TI, A2—T2 and A3—T3 to establish the desired function in the totalizer. The various steps in the operation are initiated by a series of starting pulses applied through a sequencing switch first to the vertical deflectors of the three cathode ray tubes, second to the horizontal deflectors of the first cathode ray tube, third to the horizontal deflectors of the second cathode ray tube and fourth to the horizontal deflectors of the third cathode ray tube. Aside from the setting up of the coarse and fine points of the variables and the application of the starting pulses, the operation of the computer is altogether automatic.

Referring to Fig. 1, the function generator includes three cathode ray devices 10, 11 and 12, each of which is provided with an electron gun 13 for forming a beam of electrons, a pair of electrodes 14 for deflecting the beam in a vertical direction, a pair of electrodes 15 for deflecting the beam in a horizontal direction, a screen or target 16 upon the successive squares or areas of which are recorded the successive values of the quantities indicated at the right of these targets, and the horizontal indexing wires 17. These wires 17 are connected to a common terminal 18 and thence to the corresponding coarse X set-up device and to one of the four terminals of the switch SH. Other terminals of the switch SH are connected respectively to the horizontal deflection generator DH, to a control element of the circuit AI and to the coarse X counter. The horizontal deflecting systems of all three cathode ray devices 10, 11 and 12 are similar to that described.

A single vertical deflecting system is provided for all three devices 10, 11 and 12. It includes a switch SV having four terminals which are connected respectively to one lead of a sequence switch, to an impulse generator and to opposite ends of the coarse Y set-up device.

Through the element AI impulses representative of the digits 1 of the recorded quantity are supplied to the transfer element TI, wherein they are combined with the fine X count $\Delta x$ and from which the quantities thus combined are supplied to the totalizer A—B. Similarly, through the element A2 impulses representative of the digits 1 of the quantity recorded on the screen of the device 11 are supplied to the transfer element T2, wherein they are combined with the fine Y count $\Delta Y$ and from which these combined quantities are supplied to the totalizer A—B. Impulses representative of the digits 1 of the quantity recorded on the screen of the device 12 are supplied through the element A3 and the transfer element T3 to the totalizer A—B. Also supplied to the totalizer A—B through each of the elements AI, A2 and A3 are stepping pulses representative of the digital positions of the numbers representing the different recorded quantities $a(xy)$ or $a_{ij}$, $b(xy)$ or $b_{ij}$ and $f(xy)$ or $f_{ij}$.

In the operation of the function generator of Fig. 1, the fine $x$ and $y$ counts are first set up on the devices $\Delta X$ and $\Delta Y$ and there is established in the coarse X and Y devices numbers which are dependent on the values of X and Y respectively. These dependent numbers are established on each coarse set up device by setting up a number which is equal to the highest count of the device minus the value of the variable. For example, if the coarse X value is 110 and the coarse X set-up device has five units, the number $$11001 (= 11111 - 110)$$

is set up. This is 1 less than the complement of the coarse X value 00110 and is just sufficient to fill the set-up device which is turned forward to zero in response to the addition of the complete complement of $00110(=11010)$. A starting signal is then applied through the terminal 19 of the sequence switch to the switch SV, thus starting the vertical deflection of the beam and adding to the count of the coarse Y counter at each step in the deflection until this counter is turned forward to zero and the beam stops at the horizontal row of areas containing the area on which the pertinent data is recorded.

A starting pulse is then applied through the terminal 20 of the sequence switch to the horizontal deflection generator DH with the result that the beam is deflected horizontally at a relatively high speed across the horizontal indexing wires 17. As the beam crosses each wire, there is produced a pulse by which 1 is added to the number set up in the coarse X set-up device until this device is turned forward to zero, when the switch SH is actuated to put the element AI into operating condition and to slow down the deflection of the beam, so that the pertinent recorded data is scanned at a relatively low speed.

During this scanning operation, the quantity $a(xy)\Delta x$ is stored in the totalizer A—B. When the beam reaches the horizontal indexing wire following the recorded data, there is produced an impulse by which the horizontal deflecting system of the device 10 and the control of the element A1 are restored to their initial condition, with the exception that the corresponding coarse X count is now zero.

The operations of the devices 11 and 12 for storing the quantities $b(xy)\Delta y$ and $f(xy)$ in the totalizer are similar to that just described, with the exception that a starting pulse is applied through terminal 21 of the sequence switch to the horizontal deflection generator DH of the device 11 and through the terminal 22 of the sequence switch to the deflection generator DH of the device 12.

The exact manner in which these various effects are produced will be better understood from a consideration of the wiring diagrams of the horizontal deflection generators DH (Fig. 2), the vertical deflection system (Fig. 3), the horizontal deflection system (Fig. 4), the circuits A1, A2 and A3 for producing the stepping and counting pulses (Fig. 7) and totalizer A—B (Fig. 8), and the block diagram of the totalizer (Fig. 9).

The horizontal deflection generator of Fig. 2 includes a capacitor 23, which is charged through a charging tube 24 in parallel with resistor R, and is discharged through a tube 25 in response to a starting signal supplied from the sequence terminal switch terminal 20 through a direct current amplifier 26. The resulting change in potential is applied through a coupling capacitor 27 to the single-ended push-pull amplifier stage 28—29, and thence to the horizontal deflecting electrodes 15 of the cathode ray device 10, thus deflecting the beams transversely of the indexing wires to the screen area on which the pertinent data is recorded. When the beam reaches the index wire immediatly preceding this area, the potential of the control grid of the charging tube 24 receives through a lead 30 a negative potential which cuts off the plate current in tube 24 so the capacitor 23 is now charged only through resistor R. This slows down the rate of charge and therefore the speed at which the beam is deflected. All the horizontal deflection generators DH of Fig. 1 are identical with the exception that the starting impulses are applied through different terminals of the sequencing switch and at successive times.

The complete horizontal deflection system of each of the devices 10, 11 and 12 is illustrated in Fig. 4 wherein the horizontal deflection generator of Fig. 2 is indicated as a block indicated by the reference characters DH.

Thus, the switch SH (enclosed by dotted lines) is a multivibrator or trigger circuit of well known type which includes a pair of electron discharge devices 31 and 32 interconnected in the usual manner.

The coarse X set-up device likewise consists of a number of such trigger circuit units including pairs of interconnected electron discharge devices 33—34, 35—36, 37—38, some of the intermediate units being shown as blocks and all the various units being coupled together through capacitors 39 to 42. The conductive condition of the tubes of each unit determine whether that unit is in a binary 1 or a binary 0 condition.

Thus, when the first tube 33 of the first unit is in a conductive condition and the second tube 34 of this unit is in a non-conducting condition the unit as a whole is in a binary 1 condition. When the tube 34 is conducting and the tube 33 is non-conducting the unit is in a binary zero condition. The same is true of all the other units of the coarse X counter.

Assuming all the units to be in a binary zero condition, the set-up device is turned to zero and a number equal to $N-X_1$, (where N is the number represented by all the units and $X_1$ is the coarse X count) is set up by applying negative pulses through the terminals 43 to 46 to the units which are to be turned to a binary 1 condition.

Impulses from the horizontal index wires 17 are added to this count through the lead 47 until the coarse X set-up device is full and the count reaches N when the set-up device turns to zero. These negative pulses from the horizontal index wires are also applied through a capacitor to the control grid of the tube 31 thereby ensuring that this tube is non-conducting and the tube 32 is conducting so that the negative potential of a battery 49 connected in the lead 30 is neutralized by the potential drop of the cathode resistor 50 of the tube 32.

When the set-up device clears or turns to zero, a negative pulse transmitted through a capacitor 51 switches current from the tube 32 to the tube 31 thereby permitting the negative potential of the battery 49 to be applied to the lead 30 for slowing down movement of the beam. At the same time, the positive potential drop of the cathode resistor 52 of the tube 31 neutralizes the negative potential of a battery 53 connected in the control lead of the circuit A1 thus permitting signals to be transmitted through this circuit.

The vertical deflection system of Fig. 3 includes a switch SV comprising the trigger circuit tubes 54 and 55 and a control tube 56. Positive pulses are applied from a generator 57 through a capacitor 58 to the control grid of the tube 56 which is capable of delivering negative pulses to the coarse Y set-up device and to the deflection generator DV only when the tube 54 is conducting and a positive potential drop exists in its cathode resistor 59.

Assuming the tube 54 to be conducting, the negative pulses supplied through the tube 56 function to add to the count set-up in the coarse Y set-up device and at the same time (through the amplifier 60 and rectifier 61) to increase the charge of a capacitor 62. As the charge of this capacitor increases, the voltage between the vertical deflectors 14 is increased and the beam is moved to the line of areas containing the pertinent information. Then the coarse Y counter clears and thereby transmits a positive impulse to the control grid of the tube 55 thus transferring current from the tube 54 to the tube 55 and biasing off the control tube 56. The system is restored to its initial condition by the application of a positive pulse to the lead 63.

Figs. 5 and 6 show various details of the screens and horizontal index wires of the devices 10, 11 and 12 of Fig. 1. These details are obvious from what has been said in connection with previous figures.

The circuit of Fig. 7 (element A1, A2 or A3 of Fig. 1) includes an input terminal 64 which is connected to the screen 16 and a switching terminal 65 which is connected to the corresponding terminal of the switch SH (Figs. 1 and 4). The operation of the switching signal to prevent operation of the circuit until the coarse X set-up device has cleared (turned forward to zero) is obvious from the previous explanation.

When the coarse X counter has cleared, the area containing the pertinent data is scanned at a relatively slow speed and the resulting signals are applied through the lead 64 to the control electrode of an amplifier 66 and are further amplified by the amplifiers 67 and 68. From the output of the amplifier 68, the signals are supplied to two paths, one of which includes a limiter unit 69 and a differentiator unit 70 for producing the stepping pulses and the other of which includes an amplifier unit 71, a clipper unit 72 and a differentiator unit 73 for providing the counting pulses which represent the digits 1 of the recorded data. The character of the signal pulses at each stage of their progress through the circuits is shown above the circuits and is readily understood in view of the fact (previously explained) that each pulse represents a digital position in a binary number, the high amplitude pulses represent the digit 1 and the low amplitude pulses represent the digit 0. The stepping pulses appearing at the output terminal 74 are applied to the corresponding terminal of the totalizer and the counting pulses appearing at the terminal 75 are delivered to the corresponding terminal of the transfer element T1, T2 or T3.

Fig. 8 illustrates the wiring of two units of the transfer element and two units of the totalizer which is used successively to store or accumulate the quantities $f(xy)$, $a(xy)\Delta x$ and $b(xy)\Delta y$ so that at the end of these successive operations its condition indicates the desired function $$F = f(xy) + a(xy)\Delta x + b(xy)\Delta y$$

A block diagram of the totalizer is shown in Fig. 9.

At this point, it should be understood (1) that the trigger circuit units of the switches SH and SV are of the type in which only one of the cross-connected tubes is conducting at a time and current is switched from one tube to the other by the application of a negative pulse either to the grid of the conducting tube or to the upper terminals of the anode resistors of the two tubes, (2) that the coarse $x$, $\Delta x$ coarse $y$ and $\Delta y$ set-up devices all include similar trigger circuit units which are connected in cascade as indicated at the top of Fig. 4, (3) that the units A of the totalizer include a number of trigger circuit units, and (4) that the units B of the totalizer are similar to those of the units A with the exception that they are of the slide-back type, i. e., the grid resistance of the right hand tube is made higher than that of the left hand tube so that a negative pulse applied to the grid of the right hand tube transfers current to the left hand tube for a predetermined very short time after which current is automatically returned to the right hand tube. These various set-up circuits are more fully disclosed and claimed in our co-pending application Serial No. 473,146, filed January 21, 1943, now Patent No. 2,404,047.

The circuit of Fig. 8 includes a number of transfer tubes 76, 77, etc., there being one such tube for each digital position of the number $\Delta x$, $\Delta y$ or one for $f(xy)$ as the case may be. It also includes a trigger circuit unit $A_1$, $A_2$, etc., for each digital position of the number representing the function $F = f(xy) + a(xy)\Delta x + b(xy)\Delta y$. Connected between the A units are the slide-back units $B_1$, $B_2$, etc., which transfer a digit 1 (from one A unit representing one digital position to another A unit representing the next higher digital position) when the lower digital A unit changes from a binary 1 to a binary 0 condition. Potentials representative of the quantities $\Delta x$, $\Delta y$ and a positive potential for the transfer tube of $f(xy)$ are applied through the leads 78, 79, etc., stepping pulses (one for each digital position) are applied through the lead 74 and pulses corresponding to the digits in the number recorded on the monoscope screen are applied to the lead 75. Binary digits 1 and 0 are placed above the tubes of the A units to indicate the binary condition of the unit. Thus, when the right hand tube is conducting, the unit is in a binary zero condition and its indicator 80 is unlighted and, when the left hand tube is conducting, the unit is in a binary one condition and its indicator 80 is lighted.

Assuming that the totalizer units $A_1$ and $A_2$ represent successive digital positions and that unit $A_1$ is in a binary one condition with its left hand tube conducting, the application of a negative pulse to the $A_1$ unit will convert the unit to a binary zero condition thereby applying a negative pulse to the grid of the right hand tube of the slide-back unit $B_1$ and temporarily transferring current from its right hand tube to its left hand tube. When right hand tube again becomes conducting a negative pulse is transferred through the coupling capacitor 82 to the anode resistors of the unit $A_2$. If this unit is in a binary zero condition, all that happens is the transfer of current to its left hand tube thereby converting it to a binary one condition. If it is in a binary one condition, it is converted to a binary zero condition and a negative pulse is applied through a capacitor 83 to the control grid of the right hand tube of the slide-back unit $B_2$, thereby temporarily transferring current to its left hand tube and when the current returns to its right hand tube, applying through a capacitor 84 a negative pulse whereby a digit 1 is transferred to the $A_3$ unit (see Fig. 9). This process continues throughout the successively higher digital position units of the totalizer, as will be explained more fully in connection with the consideration of a specific calculation as performed by the computers. Between these transfers of potentials from the leads 78, 79, etc., a negative pulse is applied through the lead 75 and the capacitors 85, 86, etc., to the grid of the left-hand tube of each A unit for stepping the accumulated number to the next highest digital position. How this is accomplished is apparent if a number 000000001010 be considered as established in the totalizer. Under these conditions, the application of a negative pulse to the left hand grids of all the A units has no effect on a unit which is in a binary 0 condition but converts all units in a binary 1 condition to a binary 0 condition so that all the ones in the number are transferred to the next higher digital position and the number 000000010100 appears in the totalizer.

If $\Delta x = 1101$, $a(xy) = 1010$, $\Delta y = 1001$, $b(yx) = 1110$ and $f(yx) = 1011$ as indicated on Fig. 9, the computation of the function $F = f(xy) + a(xy)\Delta x + b(xy)\Delta y$ is performed as indicated by the following tabulation in which the total number of steps in the operation are indicated in the first column, the number in the totalizer at each step is indicated in the second column, the steps at which numbers are passed by the transfer elements T1, T2 or T3 are indicated in the third column, and the stepping pulses are indicated in fourth column.

| Step | Number in totalizer | Transfer | Stepping pulses | Remarks |
|---|---|---|---|---|
| 1 | 000000001101 | 1 | | |
| 2 | 000000011010 | | 1 | |
| 3 | 000000011010 | 0 | 1 | Accumulating $a(xy)\Delta x$ during this period |
| 4 | 000000110100 | | 1 | |
| 5 | 000001000001 | 1 | 1 | |
| 6 | 000010000010 | | 1 | |
| 7 | 000010000010 | 0 | | |
| 8 | 010----10000 | | 9 | Adjusting totalizer |
| 9 | 010----11001 | 1 | | |
| 10 | 10----110010 | | 1 | |
| 11 | 10----111011 | 1 | 1 | Adding $b(xy)\Delta y$ to $a(xy)\Delta x$ during this period |
| 12 | 0----1110111 | | 1 | |
| 13 | 0----10000000 | 1 | 1 | |
| 14 | 000100000000 | | 1 | |
| 15 | 000100000000 | 0 | | |
| 16 | 000----100000 | | 9 | Adjusting totalizer |
| 17 | 000—1000001 | 1 | | |
| 18 | 00—1000010 | | 1 | Adding $f(xy)$ to $a(xy)\Delta - b(xy)\Delta y$ during this period |
| 19 | 00—1000010 | 0 | 1 | |
| 20 | 0—10000100 | | 1 | |
| 21 | 0—10000101 | 1 | | |
| 22 | 000100001010 | | 1 | |
| 23 | 000100001011 | 1 | | |

Consideration of this tabulation in connection with Fig. 9 makes clear the operation of the computer. Thus, during the first seven steps, the number 1101 is transferred to the totalizer units A once for each digit 1 in the number 1010 and in the proper digital positions to produce the product $1101 \times 1010 = 10000010$, which appears backward as read from the front of the totalizer and contains eight digital positions.

Since this product contains eight digital positions and the totalizer is shown as containing twelve digital positions, it is necessary that the number 10000010 be moved nine digital positions to bring it into the proper position for adding the product of $1001 \times 1110$. This is done by adding nine zero characters to monoscope screen area on which the number 1010 is recorded or by supplying these nine negative impulses from an impulse generator 87 such as that disclosed in our copending application Serial No. 473,146, filed January 21, 1942. Such a generator operates automatically in response to a potential from the switch SH (Fig. 1) to deliver any desired number of negative pulses. When these nine pulses have been applied, the highest digit of the number 100000101 is in the unit $A_5$, the next four lower digits of this number are in the units $A_4$, $A_3$, $A_2$ and $A_1$ and the three lower digits of this number are in the units $A_{12}$, $A_{11}$ and $A_{10}$, the lowest digit being the unit $A_{10}$.

During the steps 9 to 15, the number 1001 is transferred to the totalizer units A once for each digit 1 in the number 1110 and in the proper digital positions to produce the sum of the products $1101 \times 1010 + 1001 \times 1110 = 100000000$.

The number 100000000 is then stepped along as before to put this number in the proper position for adding the number 1011. This is done during steps 17 to 20 and the result is the sum $$100000000 + 1011 = 100001011 = f(xy) + a(xy)\Delta x + b(xy)\Delta y$$

The invention thus involves (1) the provision of means for deriving the product of two numbers one of which is set up on a set-up device and the other of which is recorded on a predetermined area of the screen or target of a cathode ray tube, (2) means for deriving the sum of a series of such products, and (3) means for adding other numbers to such sum.

We claim as our invention:

1. The combination of means for forming a beam of electrons, means having successive areas upon which are recorded different values of a predetermined quantity, a set-up device, means for moving said beam to select and scan a predetermined one of said areas, and means responsive to said beam during the scanning of said selected area for deriving the product of the value recorded on said selected area and a value established in said set-up device.

2. The combination of means for forming a beam of electrons, means having successive areas upon which are recorded different values of a predetermined quantity, a set-up device, means for moving said beam at one speed to select a predetermined one of said areas, and for moving said beam at another speed to scan said selected area, and means responsive to said beam during the scanning of said selected area for deriving the product of the value recorded on said selected area and a value established in said set-up device.

3. The combination of means for forming a beam of electrons, means having successive areas upon which are recorded different values of a predetermined quantity, a fine point set-up device, means including a coarse point set-up device for moving said beam to select and scan a predetermined one of said areas, and means responsive to said beam during the scanning of said selected area for deriving the product of the value recorded on said selected area and a value established in said fine point set-up device.

4. The combination of means for forming a beam of electrons, means having successive areas upon which are recorded different values of a predetermined quantity, a fine point set-up device, a coarse point set-up device, indexing means between certain of said areas for adding to a value established in said coarse set-up device, a horizontal deflection generator, a switch responsive to clearing of said coarse set-up device for operating said generator to move said beam to scan one of said areas, and means responsive to said beam during the scanning of said area for deriving the product of the value recorded on said scanned area and a value established in said fine point set-up device.

5. The combination of a plurality of means each having successive areas upon which are recorded values of a predetermined quantity which is different in the case of each of said means, a different fine point set-up device associated with each of said means, a different coarse point set-up device associated with each of said means, a coarse set-up devices common to all of said means, means responsive to a first of said coarse set-up devices and said common set-up device for selecting and scanning a predetermined area of a first of said means, means responsive to a second of said coarse set-up devices and said common set-up device for selecting and scanning a predetermined area of a second of said means, and means responsive to said selecting and scanning means during the scanning of said areas for deriving the sum of the product of the value recorded on the first of said selected areas multiplied by a value established in a first of said fine point set-up devices and the product of the value recorded on the second of said selected areas multiplied by a value established in a second of said fine point set-up devices.

6. The combination of a plurality of means each having successive areas upon which are recorded values of a predetermined quantity which is different in the case of each of said means, different fine point set-up device associated with two of said means, a different coarse point set-up device associated with each of said means, a coarse set-up device common to all of said means, means responsive to a first of said coarse set-up devices and said common set-up device for selecting and scanning a predetermined area of a first of said means, means responsive to a second of said coarse set-up devices and said common set-up device for selecting and scanning a predetermined area of a second of said means, means responsive to a third of said coarse set-up devices and said common set-up device for selecting and scanning a predetermined area of a third of said means, and means responsive to said selecting and scanning means during the scanning of said areas for deriving the sum of the product of the value recorded on the first of said selected areas multiplied by a value established in a first of said fine point set-up devices and the product of the value recorded on the second of said selected areas multiplied by a value established in a second of said fine point set-up devices and for deriving a mathematical result dependent on the value recorded on said third selected area and said sum.

7. The combination of means for forming a plurality of electron beams, a plurality of means upon successive areas of which are recorded different values of a predetermined quantity which is different in the case of each of said means, a different set-up device associated with each of said means, means for moving each of said beams to scan a predetermined one of said areas, means responsive to said beam during the scanning of said areas for deriving the product of the value recorded on each selected area and a value established in its associated set-up device and for deriving the sum of said products.

8. A function generator including means for producing a plurality of electron beams, a plurality of means each having successive areas on which are recorded successive values of one factor of a different term of the function to be generated, a plurality of set-up units for storing the other factors of said terms, means for moving one of said beams to select and scan a first predetermined area of a first of said successive area means, means for moving another of said beams to select and scan a second predetermined area of a second of said successive area means, and means responsive to said beam during the scanning of said areas for combining the values recorded on said first and second selected areas with the values recorded in a first and a second of said set-up units to derive first and second terms of said function and for deriving the sum of said terms.

9. A function generator including a plurality of means each having successive areas, the areas of each successive area means having recorded on them either the value of a factor of a different term of the function to be generated or the value of a complete term of said function, a plurality of means each for storing factors complementary to factors recorded on a different one of said successive area means, electron beam guide means, means for operating said electron beam means to select and scan one predetermined area in each of said successive area means, means responsive to said beam during the scanning of said areas for combining said factors to complete the incomplete terms of said function and for combining the values of the terms thus completed with the value of the term completely recorded on one of said selected and scanned areas.

10. The combination of means forming a beam of electrons, means having groups of successive areas upon which are recorded different values of a predetermined quantity, an impulse generator, means responsive to impulses delivered from said generator for moving said beam to select a predetermined one of said groups, means for moving said beam to select and scan a predetermined area of said selected group, a set-up device, and means responsive to said beam during the scanning of said selected area for deriving the product of the value recorded on said selected area and a value established in said set-up device.

11. The combination of means forming a beam of electrons, means having successive areas upon which are recorded different values of a predetermined quantity, a fine point set-up device, a coarse point set-up device, means for moving said beam, indexing means located between certain of said areas and responsive to movement of said beam for operating said coarse set-up device to select a predetermined one of said areas, and means responsive to said beam during its movement across said selected area for deriving the product of a value recorded on said selected area and a value established in said fine point set-up device.

12. The combination of means forming a beam of electrons, means having successive areas upon which are recorded different values of a predetermined quantity, means for moving said beam to scan different ones of said areas and to produce pulses in groups each representative of a different one of said values, and means responsive to said beam during the scanning of each of said areas for establishing a representation of the group of pulses by which its recorded value is represented.

GEORGE A. MORTON.
LESLIE E. FLORY.

REFERENCES CITED

The following references are of record in the file of this patent:

UNITED STATES PATENTS

| Number | Name | Date |
| --- | --- | --- |
| 2,415,191 | Rajchman | Feb. 4, 1947 |